United States Patent
Ozawa et al.

(10) Patent No.: US 8,114,317 B2
(45) Date of Patent: Feb. 14, 2012

(54) POLYIMIDE POWDER FOR ANTISTATIC POLYIMIDE MOLDED PRODUCT AND POLYIMIDE MOLDED PRODUCT THEREBY

(75) Inventors: Hideki Ozawa, Ichihara (JP); Fumio Aoki, Ichihara (JP)

(73) Assignee: UBE Industries, Ltd., Ube-Shi, Yamaguchi (JP)

( * ) Notice: Subject to any disclaimer, the term of this patent is extended or adjusted under 35 U.S.C. 154(b) by 0 days.

(21) Appl. No.: 12/791,417

(22) Filed: Jun. 1, 2010

(65) Prior Publication Data

US 2010/0237297 A1    Sep. 23, 2010

Related U.S. Application Data

(62) Division of application No. 11/422,850, filed on Jun. 7, 2006, now Pat. No. 7,754,108.

(30) Foreign Application Priority Data

Jun. 8, 2005 (JP) ................. 2005-168234

(51) Int. Cl.
*H01B 1/06* (2006.01)
*B60C 1/00* (2006.01)

(52) U.S. Cl. ............ 252/511; 524/494

(58) Field of Classification Search .......... 252/500, 252/511; 524/496
See application file for complete search history.

(56) References Cited

U.S. PATENT DOCUMENTS

| | | | |
|---|---|---|---|
| 3,444,183 A | 5/1969 | Hubbuch | |
| 4,755,428 A | 7/1988 | Noda et al. | |
| 4,759,987 A | 7/1988 | Mizobe et al. | |
| 4,810,419 A | 3/1989 | Kunimoto et al. | |
| 4,986,946 A | 1/1991 | Parish | |
| 5,026,767 A | 6/1991 | Inoue et al. | |
| 5,075,036 A | 12/1991 | Parish et al. | |
| 5,078,936 A | 1/1992 | Parish et al. | |
| 5,134,027 A | 7/1992 | Yanagita et al. | |
| 5,554,684 A | 9/1996 | Choi et al. | |
| 5,891,986 A | 4/1999 | Yamaguchi et al. | |
| 6,303,054 B1 | 10/2001 | Kanetake et al. | |
| 7,026,382 B2 | 4/2006 | Akiba et al. | |
| 2003/0181626 A1 | 9/2003 | Lindway | |
| 2004/0024107 A1 | 2/2004 | Nojiri et al. | |
| 2004/0058147 A1 | 3/2004 | Ozawa et al. | |
| 2005/0029498 A1 | 2/2005 | Elkovitch et al. | |
| 2005/0164002 A1 | 7/2005 | Krizan et al. | |
| 2006/0033226 A1 | 2/2006 | Wang | |

FOREIGN PATENT DOCUMENTS

| | | | |
|---|---|---|---|
| EP | 0 338 736 A2 | | 10/1989 |
| JP | 61-241326 A | | 10/1986 |
| JP | 62-132960 A | | 6/1987 |
| JP | 62-185748 A | | 8/1987 |
| JP | 63-81660 A | | 4/1988 |
| JP | 63-304031 A | | 12/1988 |
| JP | 01-266134 A | | 10/1989 |
| JP | 09-188813 | | 7/1997 |
| JP | 2002-088242 | * | 3/2002 |
| JP | 2004-58562 A | | 2/2004 |
| JP | 2005-330423 A | | 2/2005 |
| JP | 2006-030666 A | | 2/2006 |

OTHER PUBLICATIONS

Katz et al., "Handbook of Fillers for Plastics" p. 392 (1987).*
Kats, et al., "Handbook of Fillers for Plastics" p. 392 (1987).

* cited by examiner

*Primary Examiner* — Mark Kopec
*Assistant Examiner* — Jaison Thomas
(74) *Attorney, Agent, or Firm* — Knobbe Martens Olson & Bear LLP

(57) ABSTRACT

A polyimide powder for an antistatic polyimide molded product is disclosed. The polyimide powder comprises a polyimide-powder prepared from an aromatic tetracarboxylic acid component and a diamine component, and a conductive carbon black having a DBP oil absorption of 300 ml/100 g or more; wherein the amount of the conductive carbon black is within a range of 0.75 wt % to 5 wt % relative to the polyimide-powder. A polyimide molded product with sufficient antistatic property can be formed by molding the above polyimide powder.

9 Claims, No Drawings

_US 8,114,317 B2_

POLYIMIDE POWDER FOR ANTISTATIC POLYIMIDE MOLDED PRODUCT AND POLYIMIDE MOLDED PRODUCT THEREBY

CROSS-REFERENCE TO RELATED APPLICATIONS

This application is a divisional application Ser. No. 11/422,850, filed on Jun. 7, 2006, which claims priority to Japanese Patent Application No. 2005-168,234, filed Jun. 8, 2005, which are hereby incorporated by reference in their entirety.

BACKGROUND OF THE INVENTION

1. Field of the Invention

The present invention relates to a polyimide powder, which are prepared from an aromatic tetracarboxylic acid component and a diamine component, for forming a polyimide molded product with excellent heat resistance and antistatic property. Furthermore, the present invention relates to a method for forming an antistatic polyimide molded products from the polyimide powder, and a polyimide molded product thereby.

2. Background Art

Previously, JP-A 1986-241,326 and JP-A 1989-266,134, for example, described methods for forming a molded product of polyimide-powders prepared from an aromatic tetracarboxylic acid component, such as a 3,3',4,4'-biphenyltetracarboxylic acid component, and a diamine component, such as a p-phenylenediamine component. These references show that the above-mentioned molded products have excellent heat resistance, dimensional stability and mechanical strength such as compressive strength.

However, it is known that the molded products of polyimide-powders described in the above-indicated references do not have slidability, abrasion resistance or antistatic property in itself. Accordingly, it is known to improve these properties of a polyimide molded product by adding inorganic fine powders, other resins, graphite, or inorganic fibrous materials to polyimide-powders (JP-A 1987-132,960, JP-A 1987-185,748 and JP-A 1988-81,160).

On the other hand, JP-B 1993-28,727 discloses an antistatic aromatic polyimide film having improved antistatic property through the addition of sulfonates to polyimide. JP-A 2004-58,562 discloses an antistatic film produced by coating the surface of the polyimide film with the mixture of a metal oxide and a conductive ultrafine particle.

SUMMARY OF THE INVENTION

According to the methods described in the above-mentioned references, however, the addition of carbon or graphite of 5.5 wt % to 100 wt % relative to the polyimide is needed for the improvement in the abrasion resistance or slidability of a polyimide molded product, and consequently, the intrinsic properties of the polyimide may be impaired.

An object of the present invention is to provide a polyimide powder from which a polyimide molded product with antistatic property can be prepared without significant degradation in the intrinsic properties of the polyimide. Another object of the present invention is to provide a method for forming a polyimide molded product, and a polyimide molded product with excellent properties by using such a polyimide powder.

The present invention relates to a polyimide powder for an antistatic polyimide molded product, comprising a polyimide-powder prepared from an aromatic tetracarboxylic acid component and a diamine component, and a conductive carbon black having a DBP oil absorption of 300 ml/100 g or more;

wherein the amount of the conductive carbon black is within a range of 0.75 wt % to 5 wt % relative to the polyimide-powder.

The present invention further relates to a method for forming an antistatic polyimide molded product, comprising the steps of:

filling a mold with the above-mentioned polyimide powder, and applying a pressure and a heat to the polyimide powder for molding at the same time or different times.

The present invention still further relates to an antistatic polyimide molded product formed by the above-mentioned method.

According to the present invention, the conductive carbon black having a DBP oil absorption of 300 ml/100 g or more is added to the polyimide-powder, to obtain a polyimide powder for an antistatic polyimide molded product. The use amount of the carbon black is smaller and is 5 wt % or less relative to the polyimide-powder. By using this polyimide powder, however, a polyimide molded product with sufficient antistatic property can be formed.

According to the present invention, there can be provided a polyimide molded product with sufficient antistatic property as well as the intrinsic properties of the polyimide, and a method for forming the same.

DETAILED DESCRIPTION OF THE INVENTION

The preferred embodiments of the present invention will be described below.

1) The above-mentioned polyimide powder for an antistatic polyimide molded product, wherein the amount of the conductive carbon black having a DBP oil absorption of 300 ml/100 g or more is within a range of 1 wt % to 3 wt % relative to the polyimide-powder.

2) The above-mentioned polyimide powder for an antistatic polyimide molded product, wherein the aromatic tetracarboxylic acid component of the polyimide-powder comprise 3,3',4,4'-biphenyltetracarboxylic dianhydride.

3) The above-mentioned polyimide powder for an antistatic polyimide molded product, wherein the polyimide-powder is made of the aromatic tetracarboxylic acid component comprising 3,3',4,4'-biphenyltetracarboxylic dianhydride and 2,3,3',4'-biphenyltetracarboxylic dianhydride, and the aromatic diamine component comprising at least 80 mol % of p-phenylenediamine;

wherein a ratio of 2,3,3',4'-biphenyltetracarboxylic dianhydride in a whole of the aromatic tetracarboxylic acid component is 0.5 mol % or more and less than 30 mol %.

4) The above-mentioned polyimide powder for an antistatic polyimide molded product, wherein the diamine component of the polyimide-powder comprise p-phenylenediamine or 4,4'-diaminodiphenylether.

5) The above-mentioned method for forming an antistatic polyimide molded product, wherein the molding of the polyimide powder is performed by a hot compression molding at a molding temperature of 350° C. to 600° C. and a molding pressure of 30 MPa to 2,000 MPa; or a pre-molding at a molding temperature of room temperature to 350° C. and a molding pressure of 30 MPa to 2,000

MPa, and a post-sintering of the obtained pre-molded product without a compression at a temperature of 350° C. to 600° C.

6) The above-mentioned antistatic polyimide molded product, wherein a surface resistivity of the antistatic polyimide molded product is within a range of $10^4 \Omega/\square$ to $10^7 \Omega/\square$.

In the present invention, the polyimide-powder may be prepared from a polyamic acid solution obtained by reacting an aromatic tetracarboxylic acid component with a diamine component in an organic polar solvent. The examples of an aromatic tetracarboxylic acid component include aromatic tetracarboxylic dianhydrides, preferably 3,3',4,4'-biphenyltetracarboxylic dianhydride or pyromellitic dianhydride. The examples of a diamine component include aromatic diamines, preferably p-phenylenediamine or 4,4'-diaminodiphenylether. In this scheme, the polyimide-powder may be prepared by isolating the polyimide-precursor powder from the polyamic acid solution, and then heating and drying the polyimide-precursor powder; or by heating the polyamic acid solution for imidation, and then isolating and drying the resultant polyimide-powder.

A preferable polyimide-powder used in the present invention may be prepared from an aromatic tetracarboxylic acid component comprising an aromatic tetracarboxylic acid component which gives a crystalline aromatic polyimide and a tetracarboxylic acid component which gives an amorphous polyimide, in which the content of the tetracarboxylic acid component which gives an amorphous polyimide is about 0.5 mol % or more and less than 30 mol % relative to the whole of the tetracarboxylic acid component, and an aromatic diamine component comprising p-phenylenediamine at least about 80 mol % relative to the whole of the diamine component.

The preferable examples of an aromatic tetracarboxylic acid component which gives a crystalline aromatic polyimide include 3,3',4,4'-biphenyltetracarboxylic acid, or dianhydride thereof, or an ester thereof with a lower alcohol. The preferable examples of a tetracarboxylic acid component which gives an amorphous polyimide include 2,3,3',4'-biphenyltetracarboxylic acid, or dianhydride thereof, or an ester thereof with a lower alcohol. For both components, dianhydride is more preferable.

The ratio of the tetracarboxylic acid component which gives an amorphous polyimide (preferably 2,3,3',4'-biphenyltetracarboxylic acid component) in the whole of the tetracarboxylic acid component is preferably 1 mol % or more and less than 25 mol %, further preferably 1.5 mol % or more and less than 20 mol %.

As the above-mentioned aromatic tetracarboxylic acid component, only 3,3',4,4'-biphenyltetracarboxylic acid component (preferably 3,3',4,4'-biphenyltetracarboxylic dianhydride) and 2,3,3',4'-biphenyltetracarboxylic acid component (preferably 2,3,3',4'-biphenyltetracarboxylic dianhydride) by the above ratio is preferably used, in view of a high level of properties (especially mechanical strength and heat resistance when used) of the formed molded product thereby. A portion, preferably 50 mol % or less, especially 20 mol % or less, of the above biphenyltetracarboxylic acid components may be replaced with other aromatic tetracarboxylic acid components. Examples of such aromatic tetracarboxylic acid component include pyromellitic acid or dianhydride thereof, 3,3',4,4'-benzophenonetetracarboxylic acid or dianhydride thereof, 2,2'-bis(3,4-dicarboxyphenyl)propane or dianhydride thereof, bis(3,4-dicarboxyphenyl)methane or dianhydride thereof, and bis(3,4-dicarboxyphenyl)ether or dianhydride thereof.

In another preferred embodiment of the present invention, 3,3',4,4'-biphenyltetracarboxylic acid component (preferably 3,3',4,4'-biphenyltetracarboxylic dianhydride) is used alone as an aromatic tetracarboxylic acid component. 3,3',4,4'-biphenyltetracarboxylic acid component may be used in combination with other aromatic tetracarboxylic acid components. In this case, the use amount of other aromatic tetracarboxylic acid components is preferably 50 mol % or less, especially 20 mol % or less relative to the whole of the aromatic tetracarboxylic acid components.

As the above-mentioned aromatic diamine component, p-phenylenediamine is preferably used alone, in view of the properties of the formed molded product and ease of the polymerization/imidation operation. A small portion, preferably about 20 mol % or less, of it may be replaced with other aromatic diamines as long as the properties of the product would not be essentially impaired. Examples of such aromatic diamines include metaphenylenediamine, 4,4'-diaminodiphenylether, 4,4'-diaminodiphenylmethane, 4,4'-diaminodiphenylpropane, bis(4-aminophenyl)dimethylsilane, 1,4-bis(4-amino-phenoxy)benzene and 1,3-bis(4-aminophenoxy)benzene.

In another preferred embodiment of the present invention, as a diamine component, 4,4'-diaminodiphenylether is used alone. 4,4'-diaminodiphenylether may be used in combination with other aromatic diamines.

The preferable polyimide-powder can be obtained by polymerization and imidation of the above aromatic tetracarboxylic acid component and the above aromatic diamine component with almost equimolar amount in an organic polar solvent according to a known method, followed by collection of the powder from the reaction system.

Preferably, the above-mentioned components may be polymerized in an organic polar solvent at a temperature of 10° C. to 80° C. for 1 to 30 hours, to give a polyamic acid (imidation ratio: 5% or less) solution having a logarithmic viscosity of polymer (measurement temperature: 30° C.; concentration: 0.5 g/100 ml-solvent; solvent: N-methyl-2-pyrrolidone) of 5 or less, a polymer concentration of 25 wt % or less, and a rotational viscosity (30° C.) of 4,500 poises or less. As the organic polar solvent, there can be used those generally used for the preparation of polyamic acids (polyimide precursors) such as N,N-dimethylacetamide or N-methyl-2-pyrrolidone. Subsequently, the obtained polyamic acid solution may be heated at a temperature of 160° C. to 300° C. for about 0.2 to 20 hours, whereby the imidation is completed.

In the present invention, the polyimide-powder preferably has a mean particle size of 0.5 μm to 100 μm (a primary particle).

According to the present invention, a polyimide powder for an antistatic polyimide molded product may be prepared by adding a conductive carbon black having a DBP oil absorption of 300 ml/100 g or more by a ratio of 0.75 wt % to 5 wt %, preferably 1 wt % to 3 wt % to the above-mentioned polyimide-powder; and mixing them preferably homogeneously.

In the present invention, a conductive carbon black having a DBP oil absorption of 300 ml/100 g or more is used as a conductive carbon black added to the polyimide-powder. If a conductive carbon black having a DBP oil absorption of less than 300 ml/100 g was used, the addition of a large amount of carbon black to the polyimide-powder would be needed for achieving a surface resistivity of the polyimide molded product within a range of $10^4 \Omega/\square$ to $10^7 \Omega/\square$, with the result that the properties of the polyimide molded product may be degraded or it may become difficult to mix the polyimide-powder and the carbon black homogeneously.

The examples of the conductive carbon black having a DBP oil absorption of 300 ml/100 g or more include various ketjenblacks commercially available from Lion Corporation, such as Ketjenblack EC-600JD (powdery, DBP oil absorption: 495 ml/100 g) and Ketjenblack EC (powdery, DBP oil absorption: 360 ml/100 g).

The DBP oil absorption of the conductive carbon black is preferably within a range of 300 ml/100 g to 550 ml/100 g in view of their availability and effectiveness.

The polyimide powder for an antistatic polyimide molded product of the present invention may be obtained by adding a given amount of a conductive carbon black to a polyimide-powder, and mixing them for about 1 to 50 hours through a known method, preferably using a ball mill.

According to the present invention, a polyimide powder molded product may be formed by filling a mold with the above-mentioned polyimide powder for an antistatic polyimide molded product, and applying a pressure and a heat to it for molding at the same time or different times. Preferably, an antistatic polyimide molded product may be formed by a hot compression molding at a molding temperature of 350° C. to 600° C. and a molding pressure of 30 MPa to 2,000 MPa. It is also preferable to form an antistatic polyimide molded product by a pre-molding at a molding temperature of room temperature to 350° C. and a molding pressure of 30 MPa to 2,000 MPa, and a post-sintering of the resulting pre-molded product without a compression at a temperature of 350° C. to 600° C.

As an apparatus for forming the polyimide powder molded product, for example, a four-column hydraulic press or a high-pressure hot press may be employed. As for the pre-molded product, it may be preferably formed, for example, by using a rotary press or a tableting machine.

In the present invention, a surface resistivity of the polyimide molded product may be determined according to JIS K6911. And, a DBP oil absorption of a conductive carbon black may be determined according to ASTM D2414.

EXAMPLES

The present invention is described below in more detail with reference to Examples and Comparative Examples. However, the present invention is in no way restricted to the following Examples.

In the following description, the meanings of the abbreviations are as follows.
NMP: N-methyl-2-pyrrolidone
PPD: p-phenylenediamine
a-BPDA: 2,3,3',4'-biphenyltetracarboxylic dianhydride
s-BPDA: 3,3',4,4'-biphenyltetracarboxylic dianhydride
ODA: 4,4'-diaminodiphenylether Example 1

2987.89 g of NMP and 140.58 g (1.300 mol) of PPD as a diamine component were fed at 60° C. into a five-liter four-necked separable flask equipped with a stirring machine, a reflux condenser (with a water separator), a thermometer and a nitrogen gas feed pipe. To the resulting liquid mixture were added 26.77 g (0.091 mol) of a-BPDA and 355.71 g (1.209 mol) of s-BPDA as a tetracarboxylic acid component almost simultaneously, while stirring under a nitrogen stream. And then, the resulting liquid was stirred for 2 hours to give a solution uniformly dissolving each monomer component with NMP. Subsequently, the solution was heated up to 190° C. in about 60 minutes while stirring under a nitrogen stream, refluxing the solvent and generated water, and removing the generated water. The precipitation of polyimide-powder began to appear once the internal temperature reached around 165° C. After the internal temperature reached 190° C., the temperature was kept constant for three hours to complete the reaction. After that, the reaction liquid was cooled down, and the resulting polyimide-powder was filtrated, washed with acetone, dried in a vacuum at 150° C. for 10 hours, and subsequently dried under atmospheric pressure at 300° C. for 30 minutes to give the polyimide-powder.

To 400 g of the obtained polyimide-powder was added 8 g of the ketjenblack (EC-600JD, Lion Corporation, DBP oil absorption: 495 ml/100 g), followed by mixing with a ball mill for 24 hours to give the polyimide powder for an antistatic polyimide molded product.

Example 2

A circular mold was filled with the polyimide powder for an antistatic polyimide molded product obtained in Example 1, and was pre-heated at 300° C. for 6 hours with a pressing lid off. Immediately after the pre-heating, the pressing lid was putted on the mold, and the mold was placed in a pressing machine heated at 300° C. previously, and was heated up to 450° C. in 6 hours while pressed at 200 MPa. As soon as the temperature reached 450° C., the mold was cooled down to room temperature in 12 hours. And then, the antistatic polyimide molded product of 100 mm in diameter and 25 mm in thickness was removed from the mold.

The entire surface of the resulting antistatic polyimide molded product was black and has no colored spot, meaning excellent dispersibility. And, the surface resistivity was $5 \times 10^4 \Omega/\square$.

Example 3

The powder for an antistatic polyimide molded product was prepared in the same manner as in Example 1 except that the use amount of the ketjenblack (EC-600JD, Lion Corporation, DBP oil absorption: 495 ml/100 g) was 4 g.

Then, in the same manner as in Example 2 except for using this powder for an antistatic polyimide molded product, was formed the antistatic polyimide molded product.

The entire surface of the resulting antistatic polyimide molded product was black and has no colored spot, meaning excellent dispersibility. And, the surface resistivity was $3 \times 10^4 \Omega/\square$.

Example 4

The powder for an antistatic polyimide molded product was prepared in the same manner as in Example 1 except for using 382.49 g (1.300 mol) of s-BPDA only as a tetracarboxylic acid component.

Then, in the same manner as in Example 2 except for using this powder for an antistatic polyimide molded product, was formed the antistatic polyimide molded product.

The entire surface of the resulting antistatic polyimide molded product was black and has no colored spot, meaning excellent dispersibility. And, the surface resistivity was $5 \times 10^4 \Omega/\square$.

Example 5

The powder for an antistatic polyimide molded product was prepared in the same manner as in Example 1 except for using 382.49 g (1.300 mol) of s-BPDA as a tetracarboxylic acid component and 260.31 g (1.300 mol) of ODA as a diamine component.

Then, in the same manner as in Example 2 except for using this powder for an antistatic polyimide molded product, was formed the antistatic polyimide molded product.

The entire surface of the resulting antistatic polyimide molded product was black and has no colored spot, meaning excellent dispersibility. And, the surface resistivity was $5\times10^4\Omega/\square$.

Comparative Example 1

The powder for an antistatic polyimide molded product was prepared in the same manner as in Example 1 except for using the conductive carbon black (3350B, Mitsubishi Chemical Corporation, DBP oil absorption: 165 ml/100 g) as a carbon black.

Then, in the same manner as in Example 2 except for using this powder for an antistatic polyimide molded product, was formed the polyimide molded product.

Several parts of the surface of the resulting polyimide molded product have colored spots, meaning low dispersibility. And, the surface resistivity was $4\times10^{15}\Omega/\square$.

Comparative Example 2

The powder for an antistatic polyimide molded product was prepared in the same manner as in Example 1 except for using 40 g of the graphite (ACP, Nippon Graphite Industries, Ltd., DBP oil absorption: 100 ml/100 g) as a carbon black.

Then, in the same manner as in Example 2 except for using this powder for an antistatic polyimide molded product, was formed the polyimide molded product.

Several parts of the surface of the resulting polyimide molded product have colored spots, meaning slightly low dispersibility. And, the surface resistivity was $4\times10^8\Omega/\square$.

The particle sizes of the powders obtained in Examples 1 to 5 for an antistatic polyimide molded product were determined to be 20 μm or less through a measurement with SEM photographs (5000-fold magnification).

What is claimed is:

1. A product molded from a composition comprising a polyimide-powder which is prepared from an aromatic tetracarboxylic acid component and a diamine component, and a conductive carbon black having a DBP oil absorption of 300 ml/100 g or more; wherein the polyimide-powder is mixed with the conductive carbon black, the amount of the conductive carbon black is within a range of 0.75 wt % to 5 wt % relative to the polyimide-powder and wherein the molded product has a surface resistivity of $10^4\Omega/\square$ to $10^7\Omega/\square$.

2. A molded product according to claim 1, wherein the amount of the conductive carbon black is within a range of 1 wt % to 3 wt % relative to the polyimide-powder.

3. A molded product according to claim 1, wherein the aromatic tetracarboxylic acid component comprises 3,3',4,4'-biphenyltetracarboxylic dianhydride.

4. A molded product according to claim 1, wherein the aromatic tetracarboxylic acid component comprises 3,3',4,4'-biphenyltetracarboxylic dianhydride and 2,3,3',4'-biphenyltetracarboxylic dianhydride.

5. A molded product according to claim 1, wherein the aromatic tetracarboxylic acid component comprises 3,3',4,4'-biphenyltetracarboxylic dianhydride and not less than 0.5 mol % but less than 30 mol % of 2,3,3',4'-biphenyltetracarboxylic dianhydride, and the aromatic diamine component comprises at least 80 mol % of p-phenylenediamine.

6. A molded product according to claim 1, wherein the aromatic diamine component comprises p-phenylenediamine or 4,4'-diaminodiphenylether.

7. A molded product according to claim 1, wherein the molded product is formed by
    filling a mold with the composition; and
    applying pressure and heat to the composition in the mold at the same time or different times.

8. A molded product according to claim 7, wherein the composition in the mold is pressed at a temperature of 350° C. to 600° C. and a pressure of 30 MPa to 2,000 MPa for molding.

9. A molded product according to claim 7, wherein the composition in the mold is pressed at a temperature of room temperature to 350° C. and a pressure of 30 MPa to 2,000 MPa, and then sintered at a temperature of 350° C. to 600° C. without compression for molding.

* * * * *